Dec. 1, 1942.   K. P. BILLNER   2,303,427
INSULATION
Filed Aug. 4, 1940
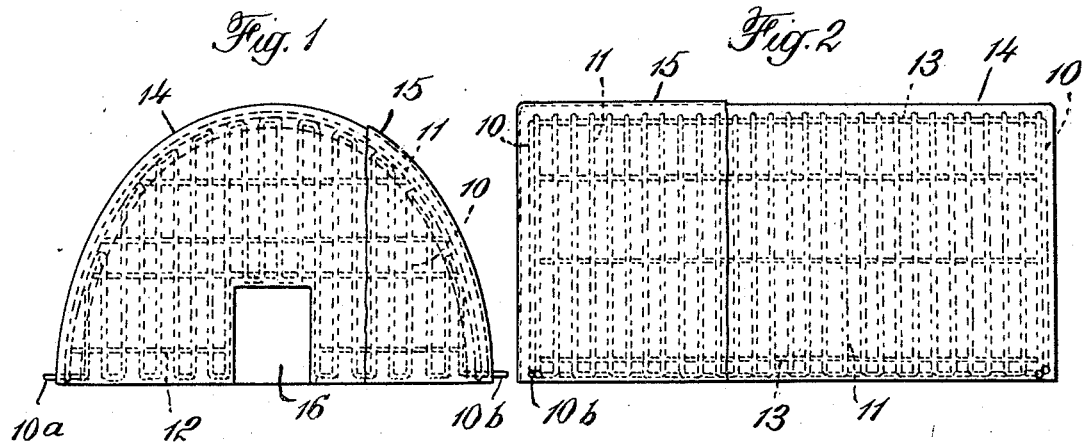
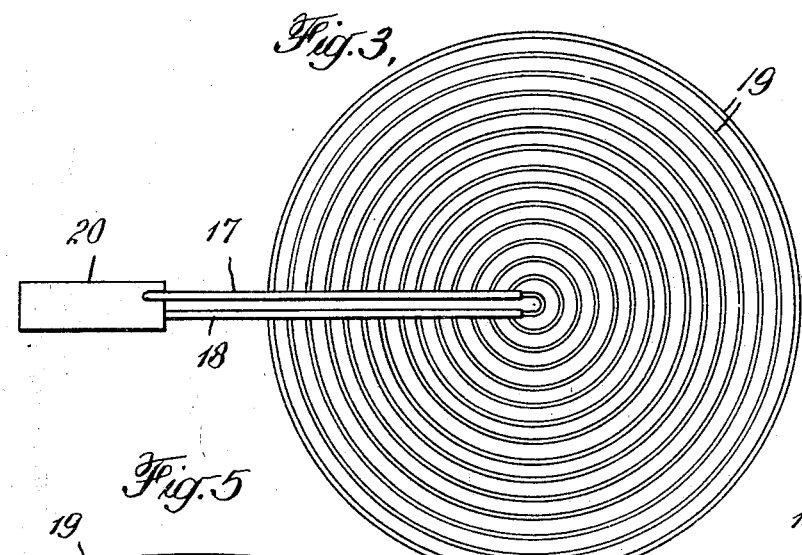
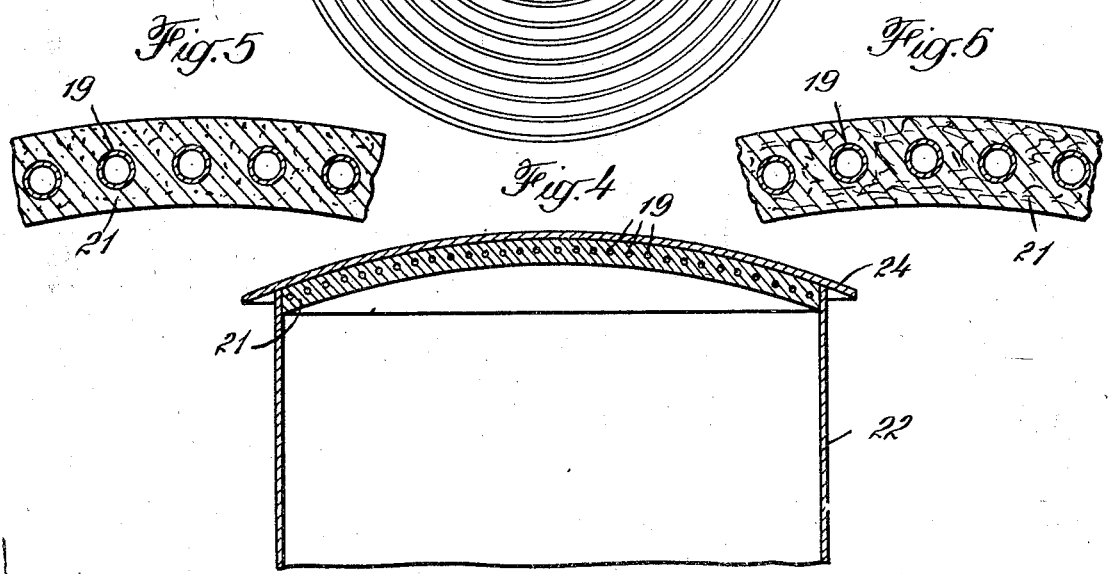
INVENTOR
Karl P. Billner
BY
Pennie Davis Marvin & Edmonds
ATTORNEY Patented Dec. 1, 1942

2,303,427

UNITED STATES PATENT OFFICE 2,303,427

INSULATION

Karl Paul Billner, New York, N. Y.

Application August 4, 1940, Serial No. 351,305

4 Claims. (Cl. 62—1)

This invention relates to insulation and has particular reference to a novel insulating construction which includes as its principal constituent a relatively thin layer of ice having one or more ducts imbedded therein for refrigeration and reinforcement purposes. The new material is inexpensive to produce, may be maintained in its proper condition at low cost, and is fireproof and highly resistant to heat transfer. Since the construction of my invention is heat absorbing as well as insulating, it may be used to particular advantage in the practice of a novel method of storage which also forms part of my invention.

This application is a continuation-in-part of my co-pending application Serial No. 309,269 filed December 14, 1939.

Storage spaces have been insulated heretofore by one or more layers of insulating material secured to or within the walls of the storage compartment, the insulating material being generally a porous substance such as rock wool, compressed fibers, cork, etc. When the temperature in the compartment is to be maintained below the ambient temperature, it is necessary to provide in addition to the insulation a suitable refrigerating medium. Natural ice has long been used for keeping storages cold but is objectionable for the reason that the ice must be heavily insulated to prevent its melting so rapidly as to render this method of storage uneconomical. Moreover, even when heavily insulated, the ice melts gradually and has to be replenished. Artificial refrigeration of storage spaces is well known and in general use, but storage plants as constructed heretofore using this method of refrigeration are relatively expensive because of the initial cost of constructing the storage compartment and insulating it, in addition to the maintenance cost of operating the refrigerating unit.

One feature of the present invention, therefore, resides in the provision of a novel insulation which may be used in the construction of storage compartments not only to insulate the content but also to refrigerate it. The new insulation comprises one or more ducts, such as pipes, made of heat conducting material and arranged to form a relatively flat frame, and a layer of ice covering the frame and through which a refrigerant is circulted by the ducts. Thus, the ducts serve not only as a circulating means for the refrigerant to maintain the insulation in its solid condition and cool the storage, but also as a binder and reinforcement for the insulation whereby it may be used to form one or more of the walls of the storage compartment. The frame of the insulation may be made from a single duct, such as a double wall panel through which the refrigerant may pass and having a layer of ice on one or both sides, or it may be made from a nest of pipes forming part of a circulatory system within the ice. When the insulation is exposed, it is preferably protected from direct sunshine and rain. I have found that a light covering, such as a layer of one inch boards, is sufficient to prevent melting of the insulation in hot weather.

Another feature of the invention resides in the provision of a novel method of storage which for many purposes is less expensive than prior methods and which offers other advantages over these methods. In accordance with the invention, I cover the storage partly or wholly with a relatively thin layer of ice which I artificially freeze and maintain in solid form by circulating a refrigerant through one or more ducts imbedded in the ice covering, the ducts being so arranged as to form a reinforcement. In this manner, a reinforced ice cover is provided which will keep its shape as long as the refrigerant is forced through the internal ducts. It will be apparent that with the new method the circulation of the refrigerant serves to maintain the covering in a form having high insulating qualities as well as to refrigerate the storage space. Since the insulation is also the refrigerating medium, the method may be practiced at relatively low cost, it being unnecessary to construct and maintain the insulation and the cooling means as separate units. Also, the new method permits the storage to be readily relocated by simply shutting off the flow of refrigerant, allowing the ice to melt, transferring the duct frame to the desired new site and freezing another covering over the frame.

These and other features of the invention will be better understood by reference to the accompanying drawing, in which Figs. 1 and 2 are front and side views, respectively, of a storage plant embodying my invention, parts of the walls being broken away;

Fig. 3 is a plan view of a frame forming part of the cover for another form of storage plant;

Fig. 4 is a vertical sectional view through part of the storage plant with the frame shown in Fig. 3 inserted in position, and Figs. 5 and 6 are enlarged sectional views of parts of modified forms of the cover shown in Fig. 4.

Referring to Figs. 1 and 2, I have shown a compartment comprising end walls each having a vertical frame of pipes 10 arranged in closely adjacent, parallel relation to form a continuous conduit. A refrigerant may be circulated through the pipes by a refrigerating unit (not shown) connected to the conduit at its opposite ends 10a and 10b. The roof and side walls of the structure, as shown, comprise a frame work of pipes 11 arranged in closely adjacent relation in the form of an arch and connected to the refrigerating unit so that a suitable refrigerant may be circulated through them. The pipes 10 and 11 may be braced by cross pieces 12 and longitudinal members 13.

The pipes 10 and 11 are supplied with water on the outside, either by sprinkling water on the pipes or conveying water to a mold formed around the pipes, whereby a shell of ice 14 is formed in which the pipes are imbedded. This shell is maintained in a solid condition by circulating the refrigerant through the pipes whenever necessary. Perishable articles may be stored within the compartment and maintained at a low temperature by the shell 14, which, if desired, may be provided with a surface covering 15 of canvass, straw or other suitable material to prevent too rapid thawing of the ice.

The cost of circulating the refrigerant through the shell is comparable with that of operating a refrigerating unit within an insulated compartment as practiced heretofore, but the new refrigerator may be constructed at a considerably lower cost than prior refrigerators for the reason that the shell 14 serves both as a cooling medium and as the insulating material. Also, since the shell 14 is transluscent, it is not necessary to insert windows for lighting purposes. If desired, one end wall of the compartment may be provided with an insulated door 16.

With the new construction the composite duct and ice material serves not only to insulate the storage and refrigerate it but also forms the main wall or walls of the storage compartment. I have ascertained that the tensile and compressive strengths of pure ice are comparable to those of lean grades of concrete depending on the temperature of the ice. Furthermore, I have found that the ice is considerably greater in strength when it has inert material dispersed in it, such as sand, sawdust, straw or the like, and also requires less refrigerant to freeze it. For example, in tests of several specimen beams at 15° F. and of the standard dimension of 11¼" x 4½" x 1" arranged with an effective span of 10" and a height of 1", the following approximate strengths were indicated:

| Material | Ultimate compressive strength, pounds per square inch |
|---|---|
| Pure frozen water, plain | 1000 |
| Frozen saturated wet sand, plain | 1200 |
| Frozen saturated wet stand, reenforced | 1500 |
| Frozen saturated wet sawdust | 1200 |
| Straw immersed in frozen water | 1200 |

The above strength figures refer to values of ultimate fibre stresses of the beams tested in flexture, the compressive strength in the reenforced specimen being determined by the straight line theory of calculation.

It will be apparent from the foregoing that the qualities of ice as a building material are similar to those of concrete except that ice has a realtively low melting point. In accordance with my invention, I provide an ice insulation containing a frame work which performs the same function as the usual reenforcements in concrete but which, in addition, conducts a refrigerant through the ice to maintain the ice below its melting temperature. If desired, a structure made in accordance with my invention may include reenforcements for the ice other than the pipes for the refrigerant. By simple regulation of the flow of refrigerant, the temperature of the ice may be kept constant so that the thermal expansion and contraction and the resulting internal stresses common to many building materials are avoided. Also, structures embodying my invention have the advantage that, unlike ordinary insulated structures, they cannot become heated gradually under the action of continuous heat. Accordingly, the new structure is admirably suited for use in the construction of cold storage buildings, gasoline storage tanks, roofs of dwellings, decks of oil tankers, etc.

Referring to Figs. 3 and 4, I have shown a storage tank for gasoline or other volatile liquids which includes a cover comprising a pipe frame shown more particularly in Fig. 3. As there shown, the frame includes an inlet pipe 17, an outlet pipe 18 and a series of concentric pipes 19 each connected at one end to the inlet pipe and at the outlet pipe. At their outer ends, the pipes 17 and 18 are connected to a refrigerating unit 20 which forces a suitable refrigerant through each of the pipes 19. If desired, the pipes 19 may be braced by reenforcing struts, not shown. The pipes, if desired, may be so arranged that the frame formed thereby is slightly dish-shaped, as shown in Fig. 4.

While the refrigerant is circulating through the pipes 19, water is supplied to the outside thereof so as to build up gradually a relatively thin layer of ice 21 in which the pipes are imbedded. The ice cover for the tank is protected against direct sunshine and rain by a thin covering, such as a layer of boards 24.

With the new storage tank, the gasoline or other volatile liquid is maintained at a relatively low temperature in spite of the action of direct sunlight on the top or side walls of the tank, because the ice cover 19—21 serves not only as an insulator against the outside heat but also as a cooling medium for the tank contents. Thus, evaporation of the contents in hot weather is greatly retarded or eliminated. This evaporation in the case of blended high grade gasolines which have been developed during recent years is a serious problem because of the change in the quantitative relation between the ingredients which results from the evaporation. With the relatively thin reinforced ice cap of my invention, for example, three inches in average thickness, at the top of the tank, the storage of these high grade gasolines is greatly simplified. Because of the ice cap, the new tank maintains the liquid content at a more uniform temperature than would be possible with an ordinary storage tank employing a refrigerating unit, since the latter construction is not well insulated and is therefore effected to a greater degree by changes in the outside temperature.

When the insulation includes a finely divided inert material, such as sand or sawdust, to provide additional strength, the particles may be readily incorporated before the ice is frozen, since they mix easily with water and do not have a tendency to float. In such insulations, the particles are dispersed throughout the ice, as shown in Fig. 5, and increase the strength considerably. Also, imbedded sawdust decreases the rate of melting of the ice. Straw immersed in water and frozen (Fig. 6) has a still lower rate of melting and makes a strong and tough material having excellent insulating qualities. When the structure is to be used for decorative purposes, the ice may be formed around refrigerating pipes made of artificial glass or other transparent plastic.

It is well known that the volume of ice is reduced when it melts and that it is also reduced if the temperature of the ice is lowered. In order to prevent surface cracking caused by sudden temperature changes, it is advisable to chill the water to freezing temperature in a receptacle before it is poured into the molds around the refrigerating pipes or sprinkled on the pipes. During the chilling operation, the water may be stirred in the receptacle to prevent it from solidifying.

In the new insulation, the ice adheres strongly to the reinforcement ducts imbedded therein so that a strong and durable composite material is formed which combines the qualities of an efficient insulator, a refrigerating unit and concrete.

I claim:

1. In a storage tank for volatile liquids, an insulating and refrigerating top for the tank comprising a frame having at least one passage therein, means for forcing a refrigerant through the passage, and a layer of ice covering the frame and reenforced by the frame.

2. In a storage tank for volatile liquids, an insulating and refrigerating top for the tank comprising a generally dish-shaped frame having at least one passage therein, means for forcing a refrigerant through the passage, and a layer of ice covering the frame and reenforced by the frame.

3. In a storage tank for volatile liquids, an insulating and refrigerating top for the tank comprising a frame having at least one passage therein, means for forcing a refrigerant through the passage, a layer of ice covering the frame and reenforced by the frame, and a protective covering for the ice.

4. In a storage tank for volatile liquids, an insulating and refrigerating top for the tank comprising a plurality of substantially concentric pipes, means for forcing a refrigerant through the pipes, and a layer of ice covering the pipes and in which the pipes are imbedded, the pipes reenforcing the ice and conducting a refrigerant through it to maintain the ice in solid form.

KARL PAUL BILLNER.